(12) United States Patent
Avis et al.

(10) Patent No.: US 8,623,561 B2
(45) Date of Patent: Jan. 7, 2014

(54) ACID DILUTION DEVICE IN CONDENSER OF PHOSPHORIC ACID FUEL CELL

(75) Inventors: Thomas Bruce Avis, Manchester, CT (US); Kazuo Saito, Glastonbury, CT (US); Michael T. Lines, South Windsor, CT (US); Ricardo O. Brown, West Hartford, CT (US)

(73) Assignee: Clearedge Power Corporation, South Windsor, CT (US)

( * ) Notice: Subject to any disclaimer, the term of this patent is extended or adjusted under 35 U.S.C. 154(b) by 60 days.

(21) Appl. No.: 13/143,568

(22) PCT Filed: Jun. 29, 2009

(86) PCT No.: PCT/US2009/049045
§ 371 (c)(1),
(2), (4) Date: Jul. 7, 2011

(87) PCT Pub. No.: WO2010/085273
PCT Pub. Date: Jul. 29, 2010

(65) Prior Publication Data
US 2011/0269036 A1  Nov. 3, 2011

(30) Foreign Application Priority Data
Jan. 21, 2009  (WO) ................ PCT/US2009/003147

(51) Int. Cl.
*H01M 8/04* (2006.01)
*H01M 8/06* (2006.01)

(52) U.S. Cl.
USPC ............................ 429/410; 429/413; 429/414

(58) Field of Classification Search
None
See application file for complete search history.

(56) References Cited

U.S. PATENT DOCUMENTS 4,372,759 A * 2/1983 Sederquist et al. ............. 95/228
6,376,114 B1 * 4/2002 Bonville et al. ............... 429/425

FOREIGN PATENT DOCUMENTS

| JP | 6052879 A | 2/1994 |
|----|-----------|--------|
| JP | 6168732 A | 6/1994 |
| JP | 8007909 A | 1/1996 |
| JP | 8017454 A | 1/1996 |
| JP | 2766434   | 6/1998 |

OTHER PUBLICATIONS

International Preliminary Report on Patentability for International application No. PCT/US2009/049045 dated Aug. 4, 2011.
International Preliminary Report on Patentability for International application No. PCT/US2009/031476 dated Aug. 4, 2011.
International Search Report and Written Opinion of the International Searching Authority for International Application No. PCT/US2009/049045 mailed Feb. 24, 2010.

* cited by examiner

*Primary Examiner* — Patrick Ryan
*Assistant Examiner* — Wyatt McConnell
(74) *Attorney, Agent, or Firm* — Carlson, Gaskey & Olds, P.C.

(57) ABSTRACT

The condenser heat exchanger includes a housing that provides a gaseous stream flowpath and a bottom wall. A gaseous stream contains acid. The housing has a fluid inlet configured to introduce a liquid, such as water. A coolant tube is disposed within the housing in the gaseous stream flowpath and provides a coolant path. Acid condenses on and falls from the coolant tube into a collection area that is provided at the bottom wall near the coolant tube. The collection area is configured to maintain storage of a predetermined amount of fluid that includes the liquid, which dilutes the condensed acid.

17 Claims, 2 Drawing Sheets

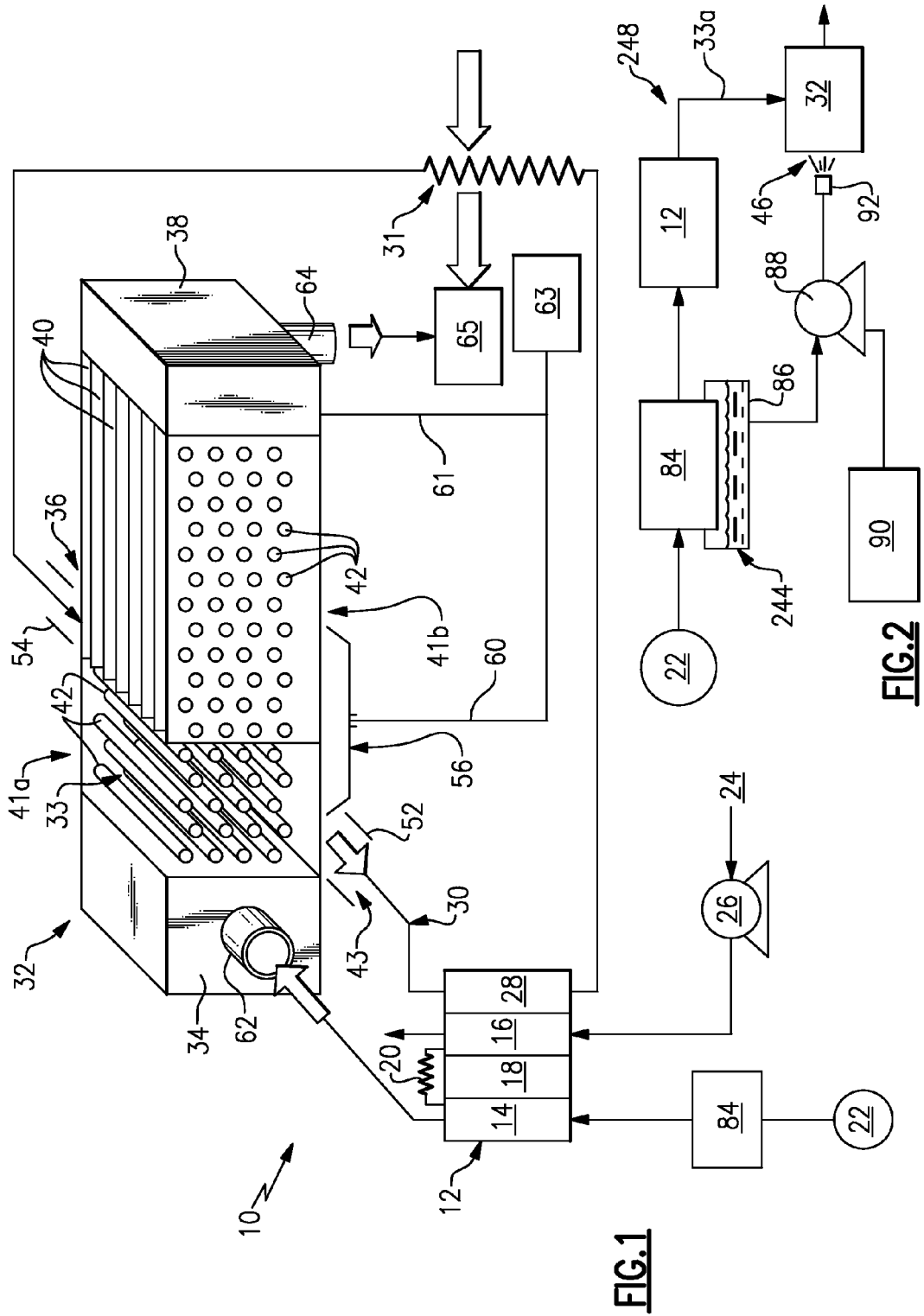

ACID DILUTION DEVICE IN CONDENSER OF PHOSPHORIC ACID FUEL CELL

This application claims priority to PCT Application No. PCT/US2009/031476, which was filed on Jan. 21, 2009.

BACKGROUND

This disclosure relates to an acid fuel cell, such as a phosphoric acid electrolyte fuel cell. More particularly, the disclosure relates to a condenser heat exchanger for use in an acid fuel cell.

One type of acid fuel cell uses a phosphoric acid electrolyte. Typically, a condenser is used in conjunction with the phosphoric acid fuel cell to condense and remove water from a gas stream, such as anode or cathode exhaust. One type of condenser heat exchanger uses multiple tubes supported in multiple fins. A coolant flows through the tubes to condense water from the gas stream flowing between the fins. The water vapor in the gas stream includes a small amount of phosphoric acid. The heat transfer fins at an upstream portion of the condenser heat exchanger have exhibited corrosion due to acid condensation on the fins. The fin edge temperature is much higher than the coolant temperature due to the heat resistance through the fin. As a result, the fin edge temperature is typically higher than the water dew point but lower than the acid dew point, which causes strong acid condensation on the fin leading to corrosion build-up.

Corrosion products must be removed during a maintenance procedure to prevent condenser corrosion and the fins from becoming blocked, which could inhibit the gas stream flow through the condenser heat exchanger. Corrosion-resistant metals, such as stainless steel and HASTELLOY, have been used for the fins and tubes. Use of corrosion-resistant metals has not extended the maintenance interval for removing corrosion products from the condenser heat exchanger to a desired duration, which may be ten years or more.

SUMMARY

A fuel cell assembly is disclosed that includes a cell stack assembly having a flow field configured to provide a gaseous flow stream having an acid. A condenser heat exchanger is arranged downstream from and fluidly connected to the flow field by a fluid flow passage. The condenser heat exchanger includes a cooling tube that is exposed to the gaseous flow stream from the flow field through the fluid flow passage. The cooling tube cools the gaseous flow stream and creates a condensed acid on the cooling tube. A water supply system includes a water source and is in fluid communication with the condenser heat exchanger at a water inlet. The condenser heat exchanger includes a collection area near the cooling tube that is configured to receive the condensed acid. The collection area maintains storage of a predetermined amount of fluid, which includes the water.

The condenser heat exchanger includes a housing that provides a gaseous stream flowpath and a bottom wall. The housing has a water or fluid inlet configured to introduce a liquid, such as water. The coolant tube is disposed within the housing in the gaseous stream flowpath and provides a coolant flowpath. The collection area is provided the bottom wall near the coolant tube.

A method of diluting an acid within a fuel cell condenser heat exchanger includes cooling a gaseous stream with a coolant flow. A first liquid from the gaseous stream is condensed on a cooling loop. A second liquid is introduced to a collection area beneath the first liquid. A predetermined amount of fluid is maintained in the collection area. The predetermined amount of fluid includes the second liquid.

These and other features of the disclosure can be best understood from the following specification and drawings, the following of which is a brief description.

BRIEF DESCRIPTION OF THE DRAWINGS

FIG. 1 is a schematic view of a portion of an acid fuel cell having a condenser heat exchanger, in accordance with an embodiment of the present disclosure.

FIG. 2 is a schematic view of a water supply system including a condenser heat exchanger and an ammonia scrubber.

DETAILED DESCRIPTION

Figure 3:
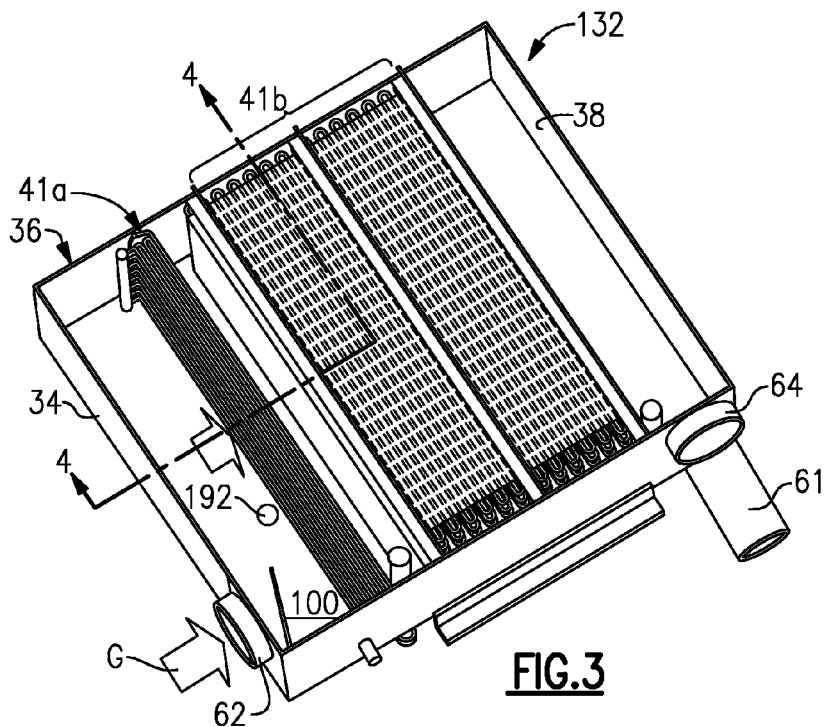
FIG. 3 is a cross-sectional elevational view of an example condenser heat exchanger.

A fuel cell 10 is depicted in a highly schematic fashion in FIG. 1. The fuel cell 10 includes a cell stack assembly 12 having an anode 14 and a cathode 16. In one example, a phosphoric acid electrolyte 18 is arranged between the anode 14 and the cathode 16. The cell stack assembly 12 produces electricity to power a load 20 in response to a chemical reaction. A fuel source 22 supplies hydrogen to a fuel flow field provided by the anode 14. In one example, the fuel source is a natural gas. Components, such as a desulfurizer, a reformer, and a saturator, may be arranged between the fuel source 22 and the anode 14 to provide a clean source of hydrogen. A wet ammonia scrubber 84 is arranged between the fuel source 22 and anode 14 to remove ammonia from the hydrogen supply. Ammonia can contaminate anode 14, reducing the efficiency of the fuel cell 10. An oxidant source 24, such as air, is supplied to an oxidant flow field provided by the cathode 16 using a blower 26.

The cell stack assembly 12 includes a coolant plate 28, in one example, to cool the cell stack assembly 12 to desired temperature. A coolant loop 30 is in fluid communication with the coolant plate 28 and a condenser heat exchanger 32. A heat exchanger 31 including coolant tubes is arranged in the coolant loop 30 to reject heat from the fuel cell 10 to ambient 65. A fluid flow or gaseous stream (G in FIGS. 3 and 4) containing water vapor flows through the condenser heat exchanger 32. In one example, the gaseous stream is provided by anode exhaust from the anode 14. However, it should be understood that a condenser heat exchanger can also be used in connection with the cathode 16.

The condenser heat exchanger 32 includes an inlet manifold 34 providing a fluid inlet receiving the gaseous stream. The gaseous stream flows through a common housing 36 to a fluid outlet 64 in an outlet manifold 38. In one example, the housing 36 is constructed from stainless steel. A fluid flow passage 33 within the housing 36 receives the gaseous stream. In one example, the condenser heat exchanger 32 is provided by a bare tube section 41a and a tube-in-fin section 41b. The heat exchanger is constructed from 316L stainless steel that is brazed together with nickel, in one example.

In one example, the tubes 42 are illustrated in a horizontal orientation. The fins 40 in the tube-in-fin section 41b of the condenser heat exchanger 32 are illustrated in a vertical orientation such that the tubes 42 are perpendicular to the fins 40. The fins 40 are arranged parallel to one another and include holes to accommodate the passage of and provide support to the tubes 42 through the fins 40. The coolant tube sections 41a, 41b illustrated in FIGS. 1 and 2 can be oriented and/or configured differently than shown and still fall within the scope of the claims. The tubes 42 provide a coolant flow passage 43 that extends between a coolant inlet 52 and coolant outlet 54, which are arranged within the coolant loop 30. The coolant inlet and outlet manifolds are not shown for clarity. Alternatively, manifolds may not be used. The fins 40 are spaced apart from and parallel with one another to provide the fluid flow passage 33, which extends between the inlet manifold 34 and the outlet manifold 38.

In addition to containing water vapor, the gas stream entering the fluid flow passage 33 also contains a small amount of phosphoric acid. Phosphoric acid has a dew point of approximately 160° C., and water vapor has a dew point of approximately 65° C. within the condenser heat exchanger 32. The coolant within the coolant flow passage 43 includes a first temperature, and the fluid, which may be anode exhaust, within the fluid flow passage 33 includes a second temperature that is greater than the first temperature. Coolant flow through the coolant flow passage 43 condenses the phosphoric acid and water vapor within the fluid flow passage 33 onto the exterior of the tubes 42. The configuration illustrated should provide a tendency for the acid to condense in the bare tube section 41a of the condenser heat exchanger 32.

The outlet manifold 38 includes a fluid line 60, for example that is fluidly connected to a first water storage tank 56. In one example, water from the condenser heat exchanger 32 can be supplied to the first water storage tank 56 that supplies the recovered water to a reformer 63 through fluid line 60. The exhaust gas from the outlet manifold 38 is exhausted to ambient 65 through fluid outlet 64. A fluid line 61 may provide a degas column that carries $CO_2$, C, back to the outlet manifold from which it is expelled from the fuel cell 10. The phosphoric acid tends to condense upstream from where the water vapor condenses due to the difference in dew points between phosphoric acid and water. Some water vapor may condense with the acid producing a diluted phosphoric acid.

Water supply system 248 is shown in FIG. 2. The wet ammonia scrubber 84 receives fuel from the fuel source 22 before providing the fuel to the anode 14 of the cell stack assembly 12. In one example, the water source 244 is provided by a second water storage tank 86 that receives excess water from the wet ammonia scrubber 84. Water from the water storage tank 86 is supplied to the condenser heat exchanger 32 through the water inlet 46 by a sprayer 92 in one example. A pump 88 pumps and pressurizes the water to the sprayer 92. A controller 90 communicates with the pump 88 to supply the water to the water inlet 46 in response to a predetermined condition, for example, at a desired interval. By using a periodic injection of water sprayed to the water inlet 46, the water dew point of the inlet gas can be lowered. As a result, excess acid forms on the heat exchanger and falls off. In one example, the wet ammonia scrubber 84 supplies water to the water storage tank 86 at 2 g/s. In the example, the water quantity desired to desuperheat the condenser heat exchanger 32 at the water inlet 46 is approximately 33.3 g/s. As a result, water will be sprayed by the sprayer 6% of the time, or approximately 5 minutes every 90 minutes of operation. An example, water storage volume for the wet ammonia scrubber 84 is 2.8 gallons, which can be reasonably accommodated in most fuel cell designs.

Figure 4:
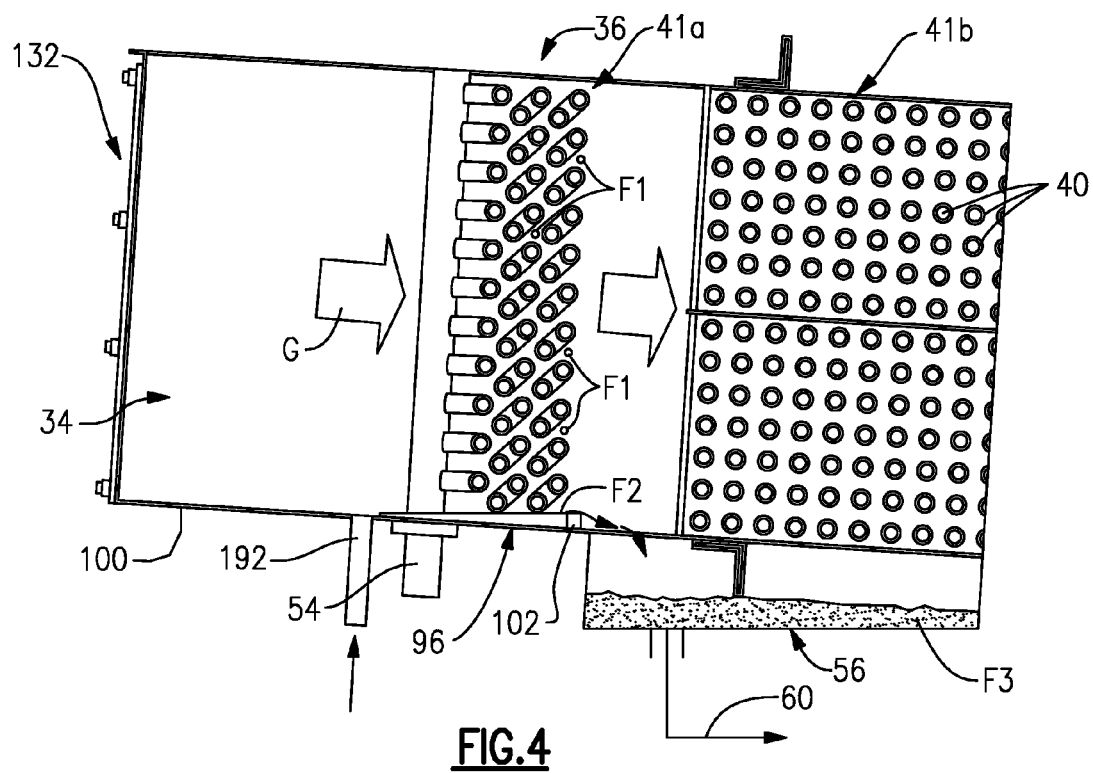
FIG. 4 is a cross-sectional view of the condenser heat exchanger shown in FIG. 3, taken along line 4-4.

Referring to FIGS. 3 and 4, a condenser heat exchanger 132 is shown. The housing 36 includes a bottom wall 100 to which a fluid or water inlet 192 is fluidly connected. In one example, water is supplied to the water inlet 192 by the water scrubber 84, for example, in a similar manner to that described relative to FIG. 2. A collection area 96 is provided in the bottom wall 100 near the bare tube section 41a. The water inlet 192 fills the collection area 96 with water. In one example, the collection area 96 is arranged immediately beneath the cooling tubes in the bare tube section 41a to collect condensed acid F1 falling from the coolant tubes, which is then diluted by the water in the collection are 96 preventing the acid from solidifying.

In one example, the bottom wall 100 is sloped downward from the inlet manifold 34 to the outlet manifold 38. A baffle 102, which acts as a dam, is provided on the bottom wall 100 slightly downstream from the inlet manifold 34 to provide the collection area 96, which sets the predetermined amount of fluid held in the collection area 96. In one example, the collection area 96 extends the full width beneath the bare-tube section 41a. The water inlet 192 provides water to the collection area at a desired interval, similar to the sprayer 92, for example, to ensure that the collection area maintains storage of a predetermined amount of water sufficient to dilute the condensed acid F1 to a dilute acid F2 having a relatively low acid concentration. Overflow from the collection area 96 flows downward along the bottom wall 100 beneath the tube-in-fin section 41b toward the fluid line 60. The dilute acid F2 is further diluted by condensed water falling from the tube-in-fin section 41b to another area beneath the tube-in-fin section 41b, providing a further dilute acid F3 (FIG. 3).

Although example embodiments have been disclosed, a worker of ordinary skill in this art would recognize that certain modifications would come within the scope of the claims. For that reason, the following claims should be studied to determine their true scope and content.

The invention claimed is:

1. A fuel cell assembly comprising:
a cell stack assembly including a flow field configured to provide a gaseous flow stream having an acid;
a condenser heat exchanger arranged downstream from and fluidly connected to the flow field by a fluid flow passage, the condenser heat exchanger including a cooling tube exposed to the gaseous flow stream from the flow field through the fluid flow passage and configured to cool the gaseous flow stream and create a condensed acid on the cooling tube;
a water supply system including a water source and in fluid communication with the condenser heat exchanger at a water inlet, the condenser heat exchanger including a collection area near the cooling tube configured to receive the condensed acid and maintain storage of a predetermined amount of fluid, which includes water;
wherein the condenser heat exchanger includes a first tube section and a second tube section, the collection area arranged beneath the first tube section, and another area arranged beneath the second tube section downstream from the collection area, the other area receiving an overflow of the fluid from the collection area; and
wherein the water supply system is configured to provide water to a first tube section, the fluid, including the condensed acid and water, overflowing the collection area to a region beneath the second tube section.

2. The assembly according to claim 1, wherein the water source includes an ammonia scrubber configured to provide the water.

3. The assembly according to claim 2, comprising a fuel source in fluid communication with the ammonia scrubber, and the cell stack assembly includes an anode downstream from and in fluid communication with the ammonia scrubber.

4. The assembly according to claim 2, wherein the water supply system includes a controller and a water storage tank configured to receive the water from the ammonia scrubber, the controller configured to selectively provide the water to the water inlet in response to a predetermined condition.

5. The assembly according to claim 4, wherein the water supply system includes a pump, the controller in communication with the pump and configured to selectively command the pump to provide the additional water to the water inlet the predetermined condition including an interval.

6. The assembly according to claim 2, wherein the condenser heat exchanger includes an inlet manifold and an outlet manifold respectively providing a fluid flow inlet and a fluid flow outlet, and multiple cooling tubes providing a coolant flow passage, the coolant flow passage arranged between the inlet and the outlet manifolds, the fluid flow passage extending between the inlet and the outlet manifolds, and the inlet manifold configured to receive the water.

7. The assembly according to claim 1, wherein the first tube section corresponds to a bare tube section, and the second tube section corresponds to a tube-in-fin section, the second tube section is arranged downstream from the first tube section.

8. The assembly according to claim 7, wherein the condenser heat exchanger includes a housing having a bottom wall providing the collection area, the bottom wall sloped downward from the bare tube section to the tube-in-fin section, and a baffle provided on the bottom wall to set the predetermined amount of fluid in the collection area and inhibit downward fluid flow from the collection area to the other area.

9. The assembly according to claim 7, wherein the collection area is arranged immediately beneath the bare tube section.

10. A condenser heat exchanger for a fuel cell assembly comprising:
a housing providing a gaseous stream flow path and including a bottom wall, the housing having a fluid inlet configured to introduce a liquid;
a coolant tube disposed within the housing in the gaseous stream flow path and providing a coolant flow path; and
a collection area provided at the bottom wall near the coolant tube, the collection area configured to maintain storage of a predetermined amount of fluid that includes the liquid; and
wherein the bottom wall is sloped downward from the fluid inlet, and the fluid inlet is provided on the bottom wall.

11. The condenser heat exchanger according to claim 10, wherein another area is arranged downstream from the collection area and configured to receive overflow fluid from the collection area.

12. The condenser heat exchanger according to claim 11, wherein the coolant tubes including a bare tube section and a tube-in-fin section, the collection area receiving condensed fluid from the bare tube section and the other area receiving condensed fluid from the tube-in-fin section.

13. The condenser heat exchanger according to claim 10, wherein the bottom wall includes a baffle downstream from the fluid inlet and that sets the predetermined amount of fluid.

14. The condenser heat exchanger according to claim 10, wherein the collection area is arranged immediately beneath the coolant tube, and another area is arranged downstream from the collection area and is configured to receive overflow of the fluid from the collection area.

15. A method of diluting an acid within a fuel cell condenser heat exchanger comprising:
cooling a gaseous stream with a coolant flow;
condensing a first liquid from the gaseous stream on a coolant loop;
introducing a second liquid to a collection area beneath the first liquid, the introducing step includes intermittently supplying the second liquid, which includes water, at a desired interval; and
maintaining a predetermined amount of fluid in the collection area that includes the second liquid.

16. The method according to claim 15, wherein the first liquid includes a condensed acid.

17. The method according to claim 15, comprising overflowing the second liquid into another area downstream from the collection area.

* * * * *